United States Patent
Wada et al.

(10) Patent No.: US 6,688,096 B2
(45) Date of Patent: Feb. 10, 2004

(54) CABLE DRAG CHAIN

(75) Inventors: Toru Wada, Osaka (JP); Akihiko Utaki, Osaka (JP); Kazunori Nakayama, Osaka (JP); Masaaki Ikeda, Osaka (JP); Shoichiro Komiya, Osaka (JP); Takayuki Matsuda, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 0 days.

(21) Appl. No.: 10/382,566

(22) Filed: Mar. 6, 2003

(65) Prior Publication Data

US 2003/0177754 A1 Sep. 25, 2003

(30) Foreign Application Priority Data

Mar. 22, 2002 (JP) ........................................ 2002-081610

(51) Int. Cl.[7] .............................................. F16G 13/16
(52) U.S. Cl. ............................. 59/78.1; 59/900; 248/49
(58) Field of Search ..................... 59/78.1, 900; 248/49

(56) References Cited

U.S. PATENT DOCUMENTS

| | | | | |
|---|---|---|---|---|
| 5,014,506 A | * | 5/1991 | Moritz ....................... | 59/78.1 |
| 5,048,283 A | * | 9/1991 | Moritz et al. ................ | 59/78.1 |
| 5,220,779 A | * | 6/1993 | Tatsuta et al. ............... | 59/78.1 |
| 5,724,803 A | * | 3/1998 | Pea ............................ | 59/78.1 |

FOREIGN PATENT DOCUMENTS

| JP | 08-308076 | 11/1996 |
|---|---|---|

\* cited by examiner

*Primary Examiner*—David Jones
(74) *Attorney, Agent, or Firm*—Woodling, Krost and Rust

(57) ABSTRACT

To provide a link bodies-connected cable drag chain, in which even in a case where a long flexible body C such as a cable, a hose or the like is incorporated a roller, which protects the flexible body, can be easily detached from the link bodies. The cable drag chain of the present invention is formed by articulately connecting a plurality of link bodies each having a pair of plates 22. Between the pair of plates 22 is rotatably provided a roller 24, which protects the flexible body. In the plate 22 is formed a through-hole 25 larger than the outer diameter of the roller 24, and to this through-hole 25 is detachably fit-secured a plug, which protects the dislodgement of the roller 24. When this plug 27 is removed the roller 24 can be easily detached from the through-hole 25.

4 Claims, 8 Drawing Sheets

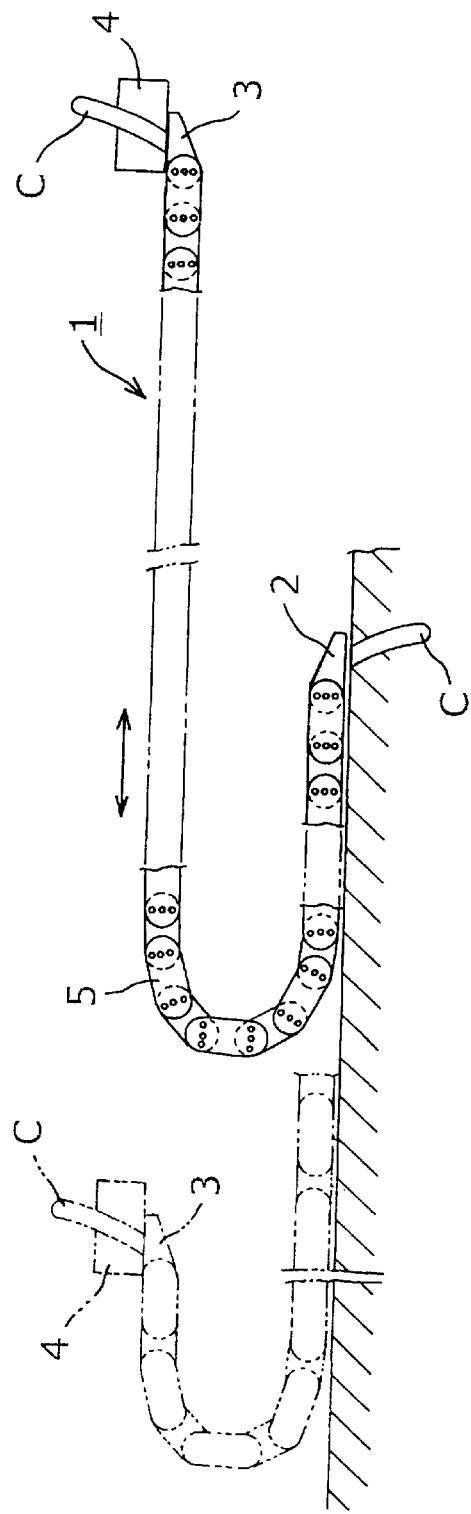

CABLE DRAG CHAIN

This patent application includes a claim of foreign priority to prior filed Japanese Patent Application 2002-081610 filed Mar. 22, 2002.

TECHNICAL FIELD TO WHICH THE INVENTION PERTAINS

The present invention relates to a cable drag chain for use in a machine tool, an electronic device, an industrial robot, a conveyor machine, and the like, which supports and protects a long flexible body such as an electric cable, an optical fiber cable, a liquid holes or the like, which supplies energy to a movable portion of the machine or device, with a roller, and holds the flexible body while following the movable portion.

RELATED ART

A cable drag chain comprising a link body, which supports a long flexible body such as an electric cable, an optical fiber cable, a liquid holes or the like, which supplies energy to a movable portion of a machine or a device, is well-known. A cable drag chain, in which a roller, which supports and protects a long flexible body was provided in a link body, is known in Japanese Patent Laid-open (Kokai) Publication No. Hei 8-308076.

In a cable drag chain 1, as shown in FIG. 13, a fixed portion side is connected to a fixed hardware 2, a reciprocating mobile portion side is connected to a mobile hardware 3, and the mobile hardware is mounted on a mobile portion 4 of a mobile machine or device. The reference mark C in FIG. 13 denotes a long flexible body such as a cable, hose or the like.

FIG. 14 shows an exploded view of assembling a link body 5 comprising a conventional cable drag chain 1. The link body 5 includes a pair of plates 6, and to these plates 6 are mounted a pair of transverse rod members 8 with screws 7. And a roller 9, which protects a long flexible body C, such as a cable, hose or the like, is rotatably held within each of these transverse rod members 8. The cable drag chain 1 is formed so that a plurality of the link bodies 5 are connected to each other in a longitudinal direction with pivot pins 10.

Problems to be Solved by the Invention

As mentioned above, the conventional cable drag chain holds the flexible body C between the upper and lower pair of transverse rod members 8, the roller 9, which protects the flexible body C, is held within the holding groove 8a of the transverse rod member 8 and at the same time this transverse rod member 8 is attached to the plate 6 of the link body 5. Accordingly, when the roller 9 is broken and it is replaced with a new one, there was a problem that the roller cannot be easily detached from the plates 6 with the flexible body C incorporated.

Accordingly, the objects of the present invention are to solve the above-mentioned prior art problems and to provide a cable drag chain, which can easily attach and detach a roller, which supports and protects a flexible body C, even in a state where a long flexible body such as a cable, hose or the like was incorporated.

Means for Solving the Problems

To attain the above-mentioned objects, the present invention according claim 1, a link bodies-flexibly-connected cable drag chain, each said link body being formed by a pair of plates oppositely spaced apart from each other connected with connecting rods, is characterized in that: a roller, whose both ends are supported by bearing portions formed on the plate, is provided between said pair of plates in such a manner that said roller is not dislodged from the bearing portions; at least one of said bearing portions is formed of a through-hole larger than an outer diameter of said roller formed in said plate and a plug attachably and disattachably fit-secured to said through-hole; and an end of a cylindrical roller play-fitted roller shaft is supported on said plug.

In the invention according to claim 2, a link bodies-flexibly-connected cable drag chain, each said link body being formed by a pair of plates oppositely spaced apart from each other connected with connecting rods, is characterized in that: a roller, whose both ends are supported by bearing portions formed on the plate, is provided between said pair of pates in such a manner that said roller is not dislodged from the bearing portions; at least one of said bearing portions is formed of a through-hole larger than an outer diameter of said roller formed in said plate and a plug attachably and disattachably fit-secured to said through-hole; and a roller shaft of a stepped roller having the roller shaft is supported on said plug.

In the present invention according to claim 3, a link bodies-flexibly-connected cable drag chain, each said link body being formed by a pair of plates oppositely spaced apart from each other connected with connecting rods, is characterized in that: a roller, whose both ends are supported by bearing portions formed on the plate, is provided between said pair of pates in such a manner that said roller is not dislodged from the bearing portions; at least one of said bearing portions is formed of a through-hole larger than an outer diameter of said roller formed in said plate and a plug attachably and detachably fit-secured to said through-hole; and an end of the roller is supported on said through hole and said plug is provided on the exterior of the roller end.

In the present invention according to claim 4, a cable drag chain according to claim 3, is characterized in that the thickness of said plug is thinner than the thickness of said plate.

Action

According to the cable drag chain, a roller, whose both ends are supported by bearing portions formed on the plates, is provided between a pair of plates oppositely spaced apart from each other connected with connecting rods, in such a manner that said roller is not dislodged from the bearing portions; at least one of said bearing portions is formed of a through-hole larger than an outer diameter of said roller formed in said plate and a plug attachably and detachably fit-secured to said through-hole; and this roller is supported on the plug or the through-hole. Accordingly, since the through-hole is larger than the outer diameter of the roller, the attachment and detachment of the roller can be performed by disassembling the plug from the through hole without disassembling the link body or removing the plate. Further, the roller is not dislodged by the plug fit-secured to the through-hole during use of the cable drag chain.

The invention will be better understood when reference is made to the BRIEF DESCRIPTION OF THE INVENTION, and CLAIMS which follow hereinbelow.

BRIEF DESCRIPTION OF THE DRAWINGS

FIG. 12 shows a plug-fitted portion in Example 4, particularly.

FIG. 13 is an entire side view of a cable drag chain for explaining a prior art.

A better understanding of the invention will be had when reference is made to the DETAILED DESCRIPTION OF THE INVENTION and CLAIMS which follow hereinbelow.

DETAILED DESCRIPTION OF THE INVENTION

Embodiments of the Invention

Figure 1:
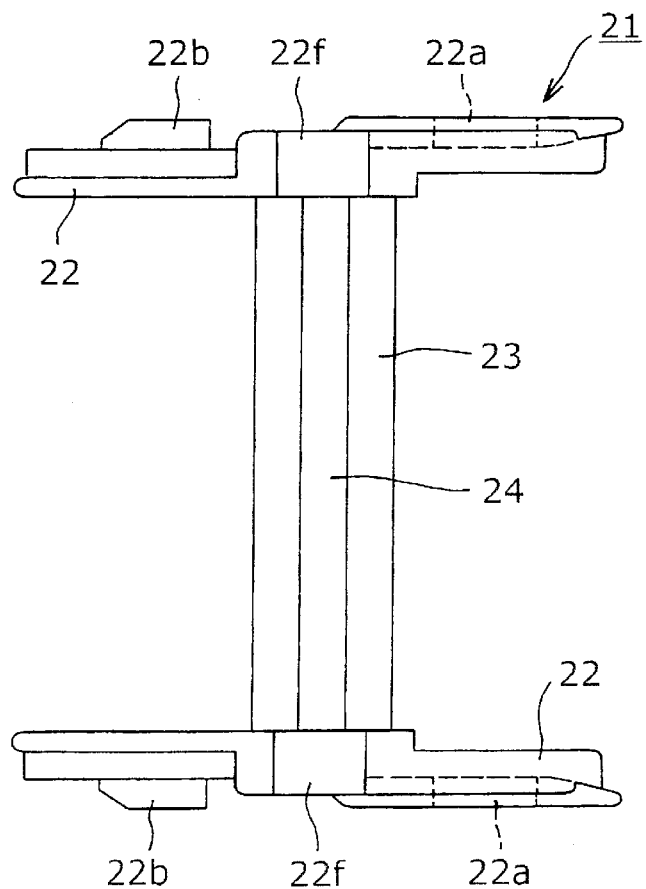
FIG. 1 is a plan view of a link body in Example 1 according to the present invention.
Figure 2:
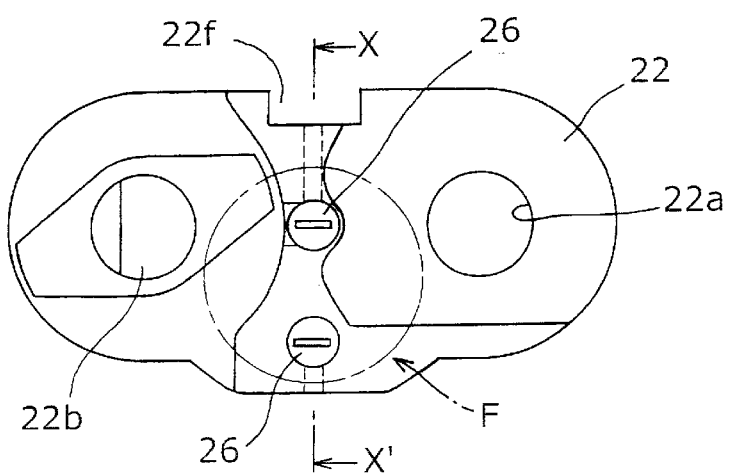
FIG. 2 is a side view of the link body shown in FIG. 1.
Figure 3:
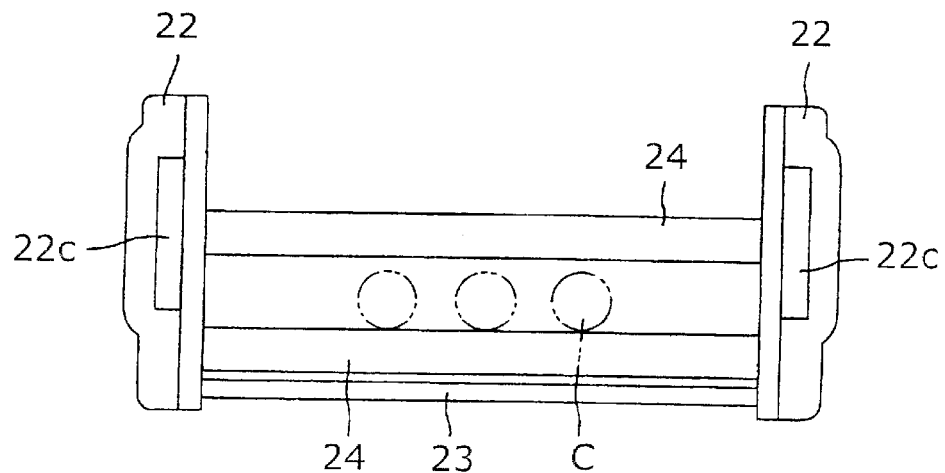
FIG. 3 is a front view of the link body shown in FIG. 1.
Figure 4:
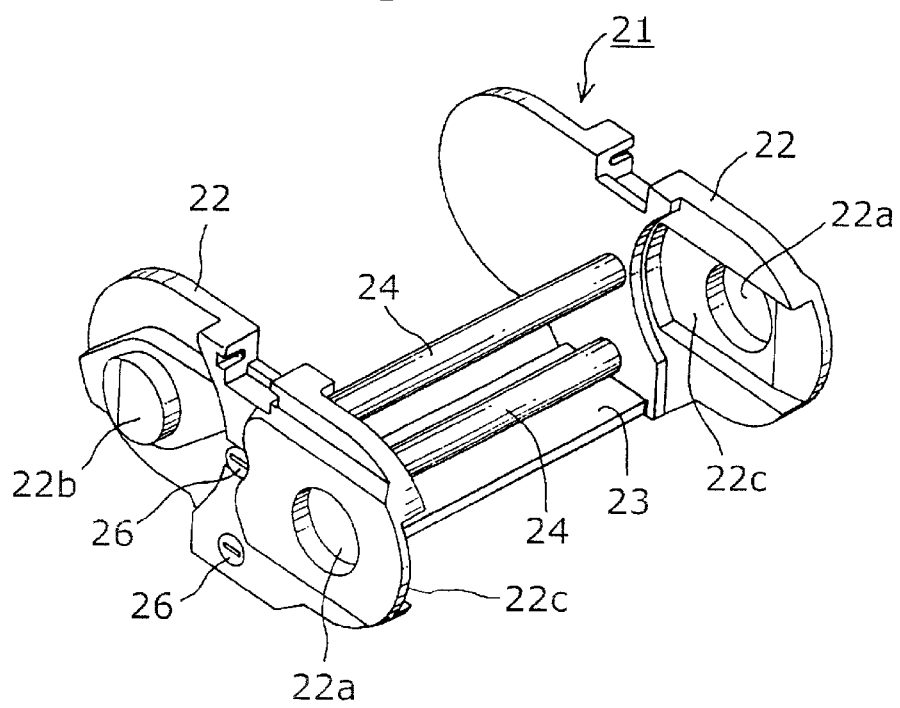
FIG. 4 is a perspective view of the link body shown in FIG. 1.
Figure 5:
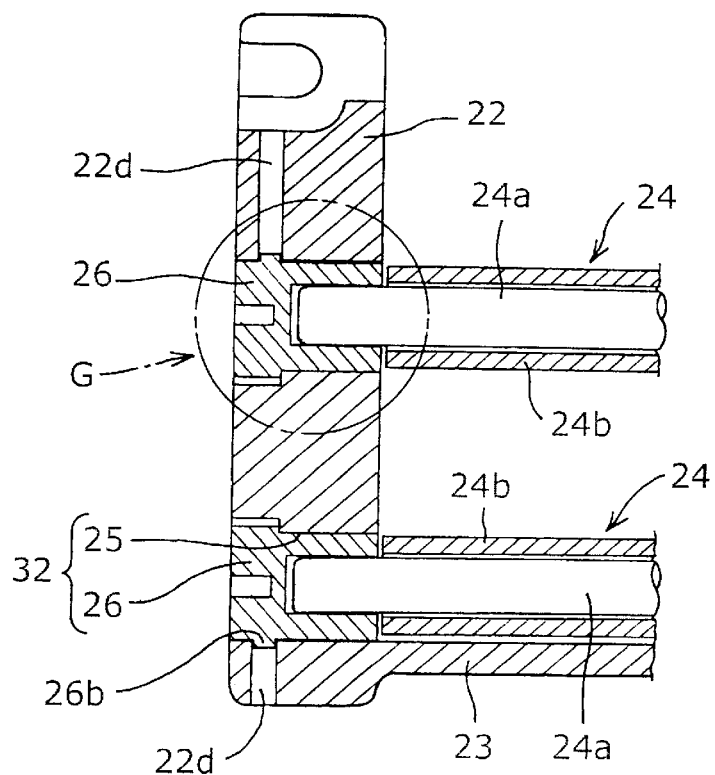
FIG. 5 is a cross-sectional view taken along the line X—X= in FIG. 2.
Figure 6:
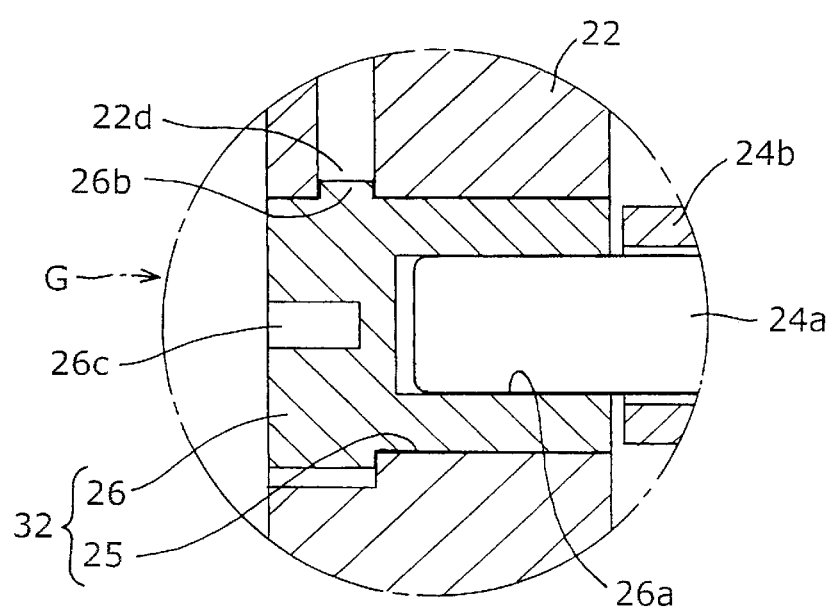
FIG. 6 is an enlarged view of a portion G in FIG. 5.
Figure 7:
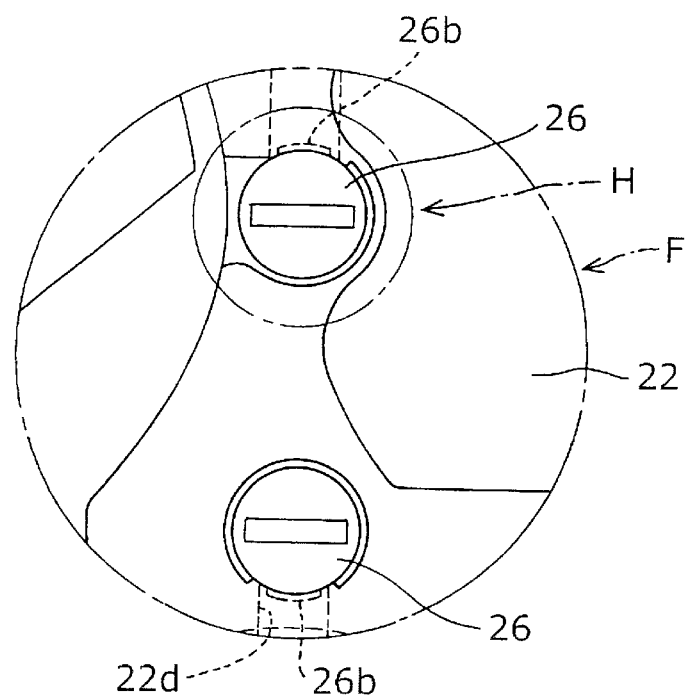
FIG. 7 is an explanatory view of a plug-fitting state.
Figure 8:
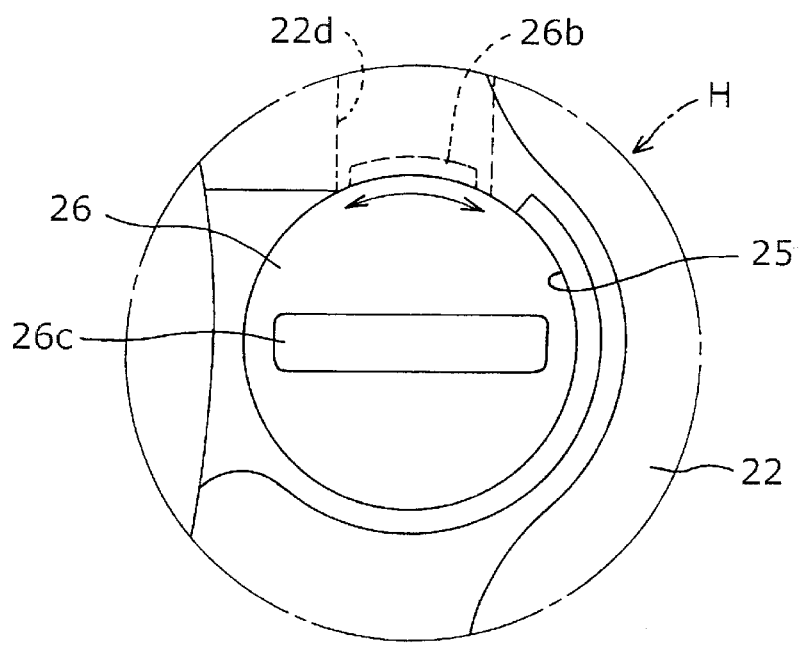
FIG. 8 is an enlarged view of a portion H in FIG. 7.

Embodiments of the present invention will be described based on Example 1 with reference to FIGS. 1 to 8. FIG. 1 shows a link body 21 forming a cable drag chain (not shown) provided with a roller 24, FIG. 2 shows a side view of the link body, FIG. 3 shows a side view of the link body, FIG. 4 shows a perspective view of the link body, FIG. 5 shows a cross-sectional view of a roller mounting portion, and FIGS. 7 and 8 show plug fixing principal portions. The cable drag chain is formed by articulately connecting these bodies 21 like prior art.

The link body 21 is formed by connecting the lower sides of a pair of plates 22, 22 spaced oppositely to each other (see FIGS. 4 and 5). In the link body 21 a connecting rod (not shown) is appropriately secured to a concave recess portion 22f on the upper side with a securing means such as a screw or the like. Further, the link body 21 is made of metal or plastics. In this case, the connection between the plate 22 and the connecting rod 23 is made by screwing, fit-securing, adhesion or integral forming or the like.

As shown in FIGS. 1 to 4, a through-hole 22a, a pivot protrusion 22b, a concave groove 22c and the like are formed in the plate 22. The cable drag chain 21 is formed by articulately connecting the link bodies 21 in such a manner that to the concave groove 22c formed on one end of the plate 22 in a link body 21 is inserted the other end of the plate 22 in the adjacent link body 21 in a longitudinal direction and that the pivot protrusion 22b is inserted to the through-hole 22a.

Between the pair of plates 22, 22 forming the link body 21 are rotatably provided the upper and lower pair of rollers 24, 24 through bearing portions 32 formed in the respective plates 22, for supporting and protecting a long flexible body C while preventing the wear thereof. The bearing portion 32 comprises a through-hole 25 and a plug 26 provided in the through-hole 25. The through-hole 25 has a larger outer diameter than that of the roller 24. It is noted that the rollers 24 are provided by a pair in Example 1, but a roller 24 may be provided on the upper or lower side only.

Further, the roller 24 comprises a rotatable cylindrical roller 24b fitted into a roller shaft 24a with play, and is supported by a plug 26 attachably and detachably fit-secured to the through-hole 25. Accordingly, the rollers 24, 24 are not dislodged from the through-hole 25 of the bearing portion 32 by this plug 26.

Namely, this plug 26 has a bearing hole 26a bearing a roller shaft 24a and a locking protrusion 26b, and the roller 24 is provided between the plates 22 by bearing the roller shaft 24a in these bearing holes 26a. As shown in FIGS. 7 and 8, the plug 26 fitted into the through hole 25 is inserted into the groove 26c with a minus driver or the like so that the locking protrusion 26b is inserted to the locking groove 22d formed in the plate 22 to be secured thereto.

In this case, the bearing portion 32 comprising the through-hole 25 and the plug 25 is not necessarily provided on the both plates, but it may be provided on at least one plate 22. Further, the bearing portion formed in the opposite other plate 22 may be a blind hole for a bearing hole so that the roller 24 is not dislodged from the hole (not shown).

In the cable drag chain having the above-mentioned configuration, the plug 26 fit-secured to the through-hole 25 prevents the roller 24 during the use of the cable drag chain from being dislodged. Further, when the plug 26 is removed, the roller 24 can be easily detached from the through-hole 25 while integrating the roller shaft 24a and the roller 24b.

Figure 9:
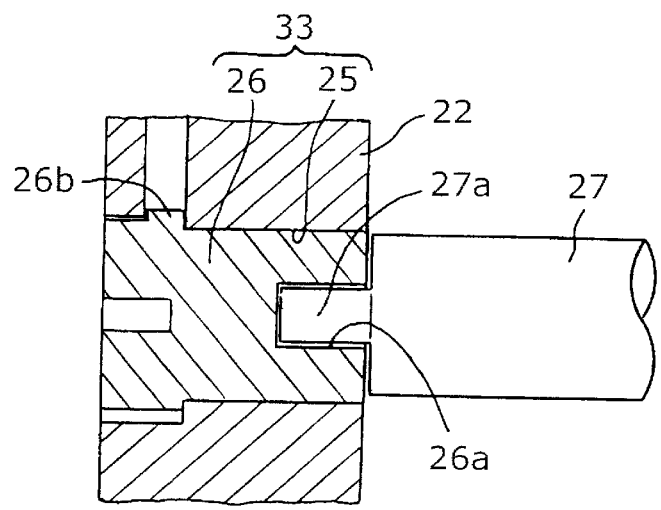
FIG. 9 is a cross-sectional view of a portion near the plug-fitted portion of Example 2.

Example 2 will be described with reference to FIG. 9. A cable drag chain (not shown) of Example 2 has substantially the same configuration as in the cable drag chain in said Example 1 except that a roller is different from that of Example 1. The same elements in Example 2 as in Example 1 are denoted as the same reference numerals as in Example 1, and the explanation in Example 2 will be appropriately made by using the reference numerals only.

A cable drag chain (not shown) in Example 2 is formed by articulately connecting the link bodies 21 as in Example 1. Further, in the plate 22 forming the link body 21 is formed a through-hole 25 having an outer diameter larger than that of the roller 27. To the through-hole 25 is detachably fit-secured a plug 26 having a bearing hole 26 bearing a shaft 27a for a roller 27, which will be described later, and a locking protrusion 26b. This through-hole 25 and the plug 26 form a bearing portion 33.

The roller 27 rotatably provided between the pair of plates 22, 22 forming a link body 21 is a solid stepped roller having a shaft 27 at an end of the roller 27. The shaft 27a of the roller 27 is rotatably supported on a bearing hole 26a in the plug 26 fit-secured to the through-hole 25. The plug 26 prevents the dislodgement of the roller 27 during the use of a cable drag chain, and after removing the plug 26 the roller 27 can be easily detached from the through-hole 25 in a flexible body-incorporated state without removing the plate 22.

Figure 10:
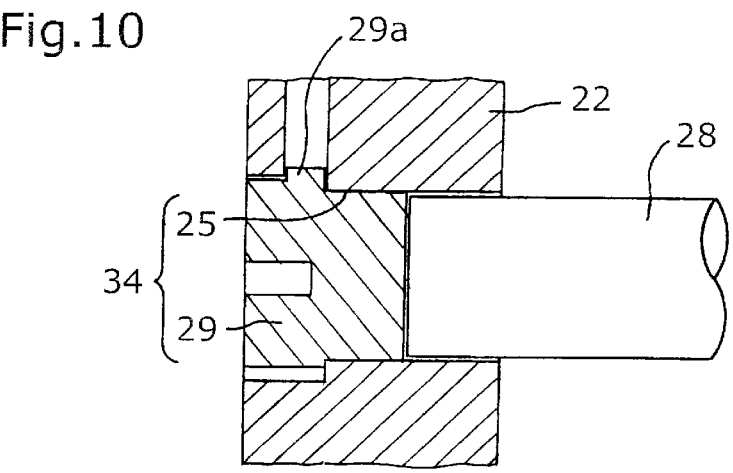
FIG. 10 is a cross-sectional view of a portion near the plug-fitted portion of Example 3.
Figure 11:
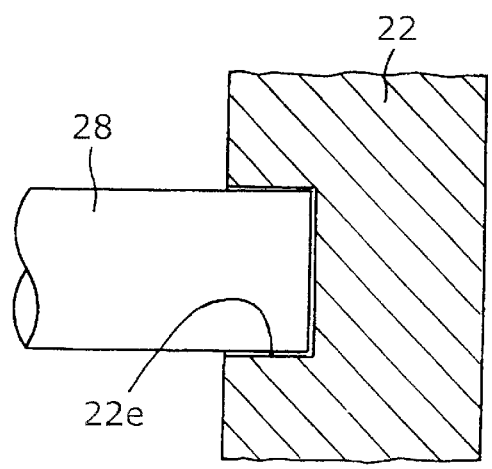
FIG. 11 is a cross-sectional view of a bearing portion for the roller in Example 3.

Example 3 will be described with reference to FIG. 10 and FIG. 11. A cable drag chain (not shown) of Example 3 has substantially the same configuration as in the cable drag chain in said Example 1 except that a roller and a plug are different from those of Example 1. The same elements in Example 3 as in Example 1 are denoted as the same reference numerals as in Example 1, and the explanation in Example 3 will be appropriately made by using the reference numerals only.

A cable drag chain (not shown) in Example 3 is formed by articulately connecting the link bodies 21 as in Example 1. Further, in the plate 22 forming the link body 21 is formed a through-hole 25 having an outer diameter larger than that of the roller 28. To the through-hole 25 is detachably fit-secured a plug 29 having a locking protrusion 29a. The thickness of this plug 29 is thinner than that of the plate 22.

The roller 28 rotatably provided between the pair of plates 22, 22 forming a link body 21 is a solid cylindrical roller having no central shaft and the like. An end of the roller 28 is directly supported in a through-hole 25. The other end of this roller 28 is supported on a blind hole 22e formed on the opposite other plate 22.

In the cable drag chain having the above-mentioned configuration, the plug 26 fit-secured to the through-hole 25 prevents the roller 28 during the use of the cable drag chain from being dislodged. Further, when the plug 29 is removed, the roller 28 can be easily detached from the through-hole 25.

Figure 12A:
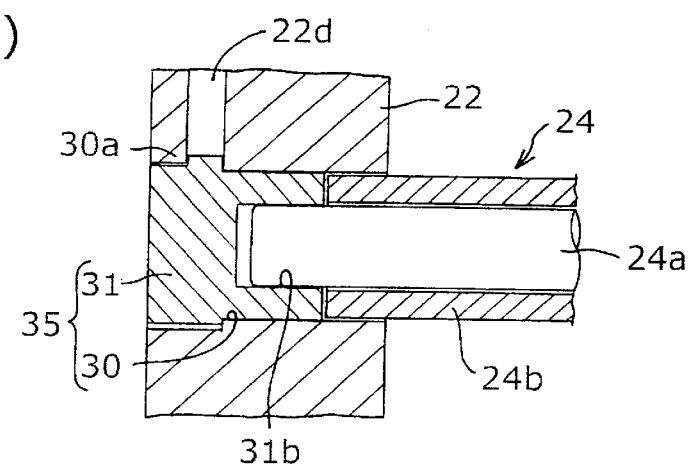
FIG. 12(A) shows a cross-sectional view.
Figure 12B:
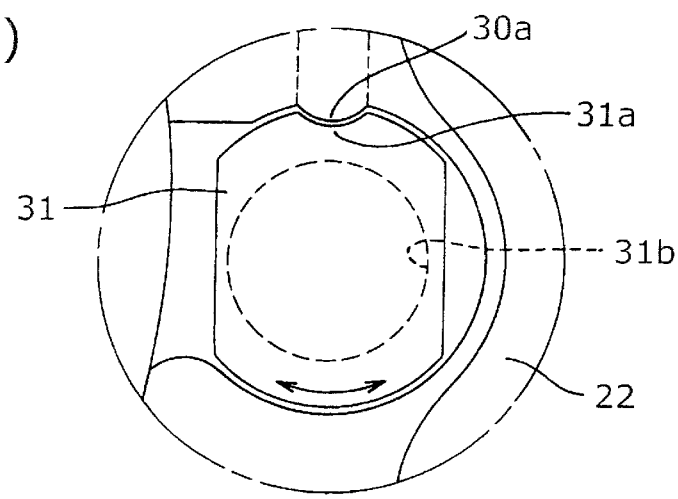
FIG. 12(B) shows a plug-fitted state.
Figure 12C:
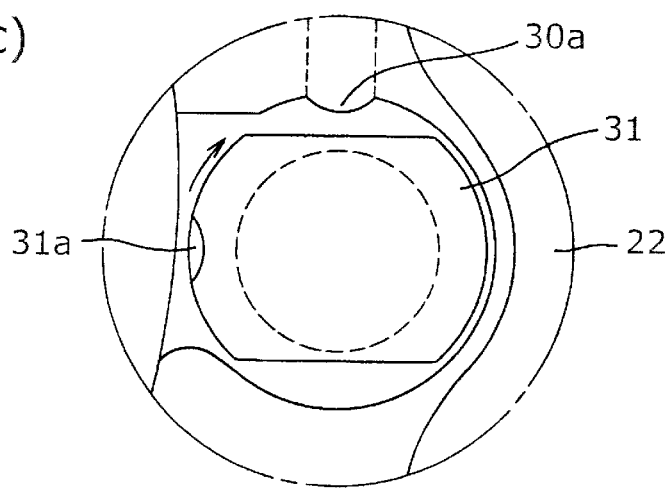
FIG. 12(C) shows an explanatory view of a plug detachable state.
Figure 14:
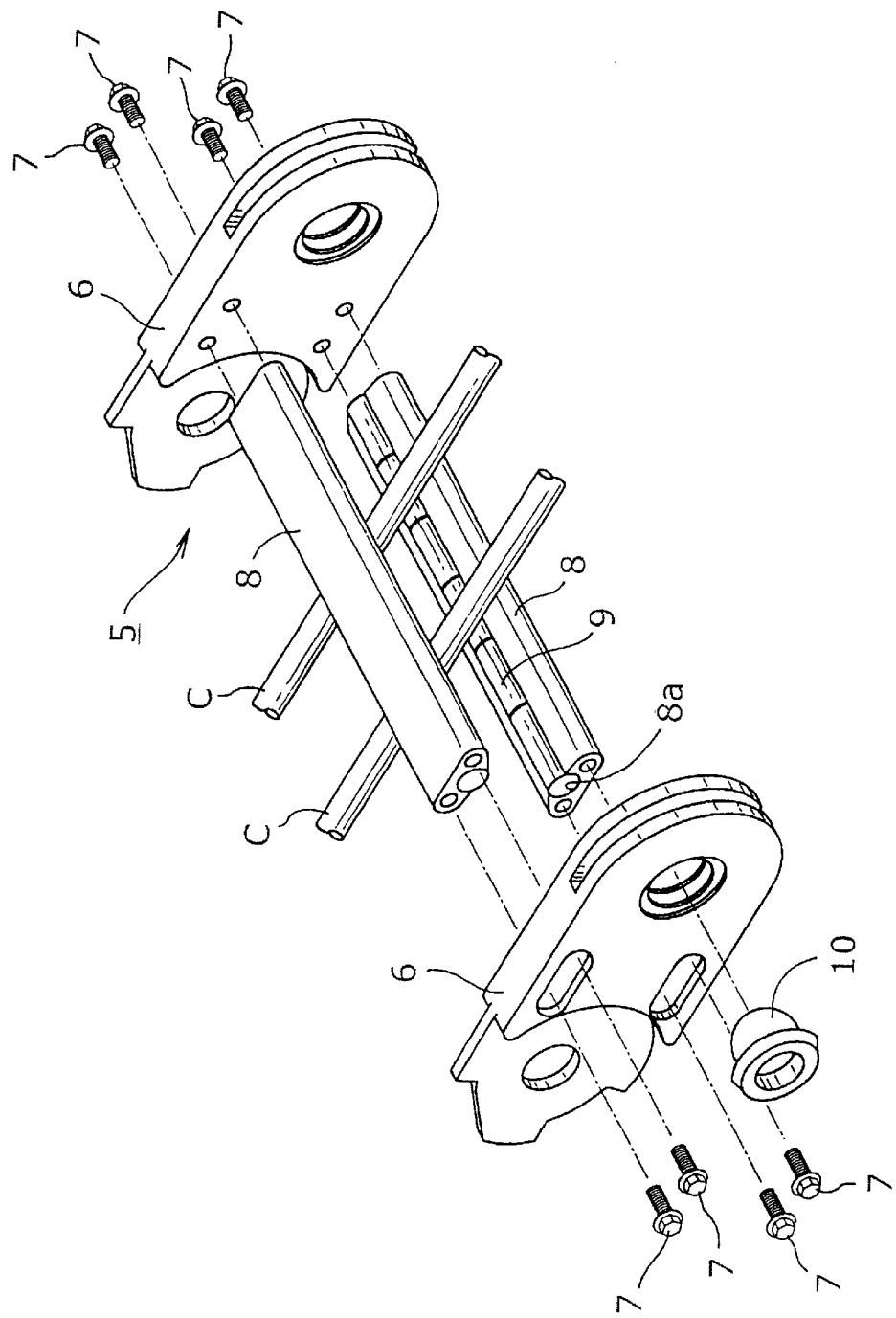
FIG. 14 shows an exploded view of assembling a link body comprising a conventional cable drag chain.

Example 4 will be described with reference to FIGS. 12(A) to 12(C). A cable drag chain (not shown) of Example 4 has substantially the same configuration as in the cable drag chain in said Example 1 except that a securing means for a plug is principally different from that of Example 1. The same elements in Example 4 as in Example 1 are denoted as the same reference numerals as in Example 1, and the explanation in Example 4 will be appropriately made by using the reference numerals only.

A cable drag chain (not shown) in Example 4 is formed by articulately connecting the link bodies 21 as in Example 1. Further, in the plate 22 forming the link body 21 is formed a through-hole 30 having an outer diameter larger than that of the roller 24. To the through-hole 30 is detachably fit-secured a plug 31, and a bearing portion 35 is formed of the through-hole 30 and the plug 31.

The roller 24 rotatably provided between a pair of plates 22, 22 forming the link 21 comprises a cylindrical roller 24b fitted to a roller shaft 24a with play as in Example 1.

A surface protrusion 30a protruding on an inner peripheral side is provided at a peripheral edge portion of the through-hole 30 formed in the plate 22. The thickness of the plug 31 is thinner than that of the plate 22. Further, the plug 31 has a cut out portion 31a larger than the surface protrusion 30a and also has a bearing hole 31b.

The plug 31 is fitted into the through-hole 30 by supporting the roller shaft 24a on the bearing hole 31b. In this case, the plug 31 is detachable in a state shown in FIG. 12(C), and when the plug 31 is rotated, such a state as shown by FIGS. 12(A) and 12(B) is obtained so that the surface protrusion 30a and the large cut out portion 31a are matched with each other to be locked therebetween.

In the cable drag chain having the above-mentioned configuration, the plug 31 fit-secured to the through-hole 30 prevents the roller 24 during the use of the cable drag chain from being dislodged. Further, when the plug 31 is removed, the roller 24 can be easily detached from the through-hole 30 in a flexible body incorporated state.

EFFECTS OF THE INVENTION

As described above, according to the present invention, a roller, whose both ends are supported by bearing portions formed on the plates, is provided between a pair of plates oppositely spaced apart from each other, in such a manner that said roller is not dislodged from the bearing portions, and the roller is supported on a plug detachably fit-secured to a through-hole forming a bearing portion or on the through-hole. Therefore, when the roller is broken, the attachment and detachment of the roller can be easily performed by disassembling the plug from the through-hole without disassembling the link body or removing the plate while incorporating a long flexible body such as a cable or the like to a cable drag chain, whereby improvement of the maintenance can be executed. Further, the plug fit-secured to the through-hole prevents the roller during the use of the cable drag chain from being dislodged. Further cost reduction can be performed by making the other bearing portion a blind hole.

Description of Reference Numerals

1 . . . Cable drag chain
2 . . . Fixed hardware, 3 . . . Mobile hardware
4 . . . Mobile portion, 5 . . . Link body
21 . . . Link body, 22 . . . Plate
22a . . . Through-hole, 22b . . . Pivot protrusion
22c . . . Concave groove, 22d . . . Locking groove
22e . . . Blind hole, . . . Concave recess portion
23 . . . Connecting rod, 24 . . . Roller
24a . . . Roller shaft, 24b . . . Cylindrical roller
25 . . . Through-hole, 26 . . . Plug
26a . . . Bearing hole, 26b . . . Locking protrusion
26c . . . Groove, 27 . . . Roller
27a . . . Shaft, 28 . . . Roller
29 . . . Plug, 29a . . . Locking protrusion
30 . . . Through-hole, 30a . . . Surface protrusion
31 . . . Plug, 31a . . . Cut out portion 31b . . . Bearing hole
32, 33, 34, 35 . . . Bearing portion The invention described hereinabove has been set forth by way of example only, and those skilled in the art will understand that many modifications and changes may be made to the invention without departing from the spirit and scope of the CLAIMS which follow hereinbelow.

We claim:

1. A link bodies-flexibly-connected cable drag chain, each said link body being formed by a pair of plates oppositely spaced apart from each other connected with connecting rods, characterized in that:

a roller having a first end, a second end, and an outside diameter, a bearing portion formed in each of said plates, each of said ends of said roller is supported by said bearing portions formed in said plates, said roller is mounted between said pair of plates such that said roller is not dislodged from said bearing portions;

at least one of said bearing portions is formed of a through-hole in one of said plate, said through-hole having a larger diameter than said outer diameter of said roller, a plug attachably and detachably fit-secured to said through-hole;

said roller includes an end having a roller shaft;

and, said roller shaft is supported by said plug.

2. A link bodies-flexibly-connected cable drag chain, each said link body being formed by a pair of plates oppositely spaced apart from each other connected with connecting rods, characterized in that:

a roller having a first end, a second end, and an outside diameter, a bearing portion formed in each of said plates, each of said ends of said roller is supported by said bearing portions formed in said plates, said roller is mounted between said pair of plates such that said roller is not dislodged from said bearing portions;

at least one of said bearing portions is formed of a through-hole in one of said plates, said through-hole having a larger diameter than said outer diameter of said roller, a plug attachably and detachably fit-secured to said through-hole;

said roller includes an end having a roller shaft;

and, said roller shaft includes a stepped portion supported by said plug.

3. A link bodies-flexibly-connected cable drag chain, each said link body being formed by a pair of plates oppositely spaced apart from each other connected with connecting rods, characterized in that:

a roller having a first end, a second end, and an outside diameter, a bearing portion formed in each of said plates, each of said ends of said roller is supported by said bearing portions formed in said plates, said roller is mounted between said pair of plates such that said roller is not dislodged from said bearing portions;

at least one of said bearing portions is formed of a through-hole in one of said plates, said through-hole having a larger diameter than said outer diameter of said roller, said roller includes an exterior and a plug; and, said plug attachably and detachably fit-secured to said through-hole.

4. A cable drag chain according to claim 3, characterized in that said plug includes a thickness and said plate includes a thickness, and said thickness of said plug is thinner than said thickness of said plate.

* * * * *